United States Patent [19]

Oi et al.

[11] Patent Number: 5,174,519
[45] Date of Patent: Dec. 29, 1992

[54] FILM CASSETTE

[75] Inventors: Nakao Oi; Koichi Takahashi; Kazunori Mizuno; Hisashi Takahashi, all of Kanagawa, Japan

[73] Assignee: Fuji Photo Film Co., Ltd., Kanagawa, Japan

[21] Appl. No.: 766,920

[22] Filed: Sep. 27, 1991

Related U.S. Application Data

[63] Continuation of Ser. No. 465,956, Jan. 16, 1990, abandoned.

[51] Int. Cl.⁵ .............................................. G03B 17/26
[52] U.S. Cl. ...................... 242/71.1; 354/275
[58] Field of Search .................... 242/71.1, 71.2; 354/275, 277; 206/409

[56] References Cited

U.S. PATENT DOCUMENTS

| | | | |
|---|---|---|---|
| 2,329,228 | 9/1943 | Stiffler | 354/277 |
| 3,384,318 | 5/1968 | Nerwin et al. | 242/71.1 |
| 3,537,376 | 11/1970 | Fleming et al. | 354/277 |
| 3,695,160 | 10/1972 | Stockdale | 242/71.1 X |
| 3,894,700 | 7/1975 | Ito et al. | 242/71.2 |
| 3,953,870 | 4/1976 | Stolper | 354/277 |
| 4,239,164 | 12/1980 | Barnsbee et al. | 242/71.1 X |
| 4,407,579 | 10/1983 | Huff | 354/275 |
| 4,423,943 | 1/1984 | Gold | 354/275 |
| 4,616,914 | 10/1986 | Buelens et al. | 242/71.1 X |
| 4,787,506 | 11/1988 | Akao | 242/71.1 X |
| 4,796,823 | 1/1989 | Akao et al. | 242/71.8 |
| 4,832,275 | 5/1989 | Robertson | 242/71.1 |
| 4,834,306 | 5/1989 | Robertson et al. | 242/71.1 |
| 4,846,418 | 7/1989 | Fairman | 242/71.1 |
| 4,875,638 | 10/1989 | Harvey | 242/71.1 |
| 4,938,429 | 7/1990 | Robertson et al. | 242/71.1 |

FOREIGN PATENT DOCUMENTS

| | | | |
|---|---|---|---|
| 2807233 | 8/1978 | Fed. Rep. of Germany | 242/71.1 |
| 37-32164 | 12/1937 | Japan . | |
| 43-3416 | 2/1943 | Japan : | |
| 55-21089 | 6/1980 | Japan . | |
| 1112349 | 5/1968 | United Kingdom | 242/71.1 |

Primary Examiner—John M. Jillions
Attorney, Agent, or Firm—Young & Thompson

[57] ABSTRACT

In a film cassette, a spool having a roll of film wound on it is rotatable within a cassette body, but the film leader of this film does not protrude from the cassette body. The roll of film is held between a pair of flanges of the spool or the film roll is pressed by a projecting member and a resilient member disposed on the inner wall of the cassette body. Thus the roll of film, when the spool is rotated, is also rotated together with it. As a result, the film leader is fed outside the cassette. In order to prevent light from entering the cassette from the film withdrawing slot, the film withdrawing slot is closed by a cover member and a mask. Also, by virtue of a provision of a film passage extending within the cassette in a curved state or by mounting a projecting portion on the film leader, the interior of the cassette is masked.

3 Claims, 11 Drawing Sheets

FILM CASSETTE

This application is a continuation of application Ser. No. 07/465,956, filed Jan. 16, 1990, now abandoned.

BACKGROUND OF THE INVENTION

This invention relates to a light-tight film cassette containing a roll of photographic film and more particularly to a film cassette in which a film leader of a film roll is fed by rotating a spool having a roll of film wound on it.

Figure 34:
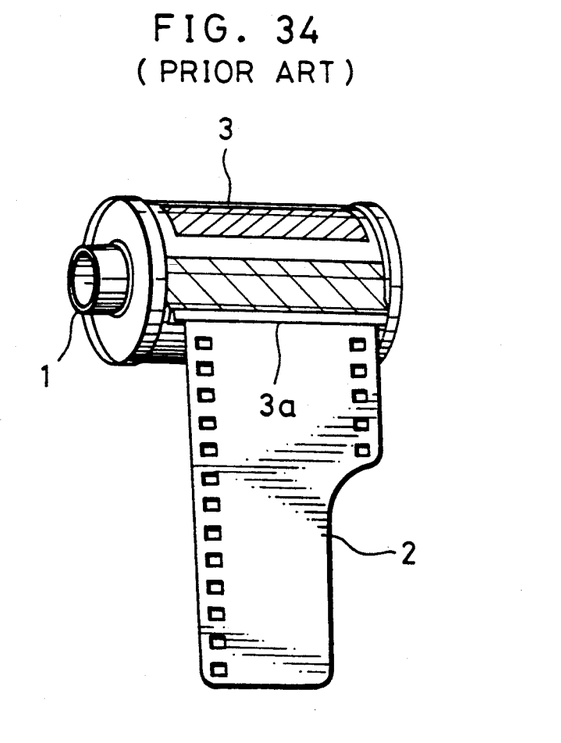
FIG. 34 is a perspective view of a conventional film cassette.

In single lens reflex cameras and in compact cameras, a film cassette containing a roll of photographic film strip 35 mm in width is used, as shown in FIG. 34. This type of 35 mm film cassette is designed such that the film strip with one end thereof retained by a spool 1 made of a synthetic resin is wound on the spool 1, the spool 1 having this roll of film rotatably contained in a metallic cassette shell or cassette body 3 and the film leader 2 of the roll of film initially protruding from a film withdrawing slot 3a.

As is known from Japanese Utility Model Publ. No. Sho 41-6297, a plush having long fibers is attached to the inner surface of the film withdrawing slot 3a in order to prevent light from entering the cassette shell 3 through the film withdrawing slot 3a. The film withdrawing slot 3a may be marked, as taught in Japanese Patent Publ No. Sho 43-3416 or Japanese Utility Model Publ. No. Sho 37-32164. Also, with regard to the cassette shell 3, several proposals are made for forming it from a synthetic resin, for example, in order to reduce its weight (Japanese Patent Publ. No. Sho 55-21089).

However, in the case of the above-mentioned film cassette, since the film leader 2 protrudes from the cassette shell 3 even when the film cassette has not yet been used, it sometimes occurs that the users, who may not be very familiar with such products, are at a loss to know how to handle the film leader 2 when putting the film cassette into a camera.

Because of the above, U.S. Pat. Nos. 4,832,275, 4,834,306 and 4,846,418 propose film cassettes in which the film leader is also taken up and kept within the cassette while the film is still unused and the film cassette containing not only the film but also the film leader can be put into a camera in that state. These film cassettes are so designed that the spool disposed within the cassette is rotated by a mechanism on the side of the camera in order to feed the film leader. As the film leader does not protrude from the cassette at all, the operation of loading the film cassette into the camera is easy.

Film cassettes are known, wherein the spool is manually rotated to feed the film leader before the film cassette is put into a camera, as in U.S. Pat. Nos. 4,407,579 and 4,423,943.

In order to feed the film leader smoothly and reliably from the film withdrawing slot by rotating the spool, it is necessary to reduce the resistance applied to the film strip at the time the film is being fed. It is also required, as in the conventional film cassette, that a light-stopping structure be provided so that outside light does not enter the cassette through the film withdrawing slot. If plush is used, as in the prior art, in order to meet this requirement, the resistance applied to the film leader at the time the film is being fed will be great. As a result, the film leader can be bent in the middle of feeding the film and jamming can take place, which stops the feeding of the film. Particularly, in case light is to be excluded merely by providing the plush on the film withdrawing slot, the plush must have a high density of pile yarns and therefore the resistance to movement of the film leader is greatly increased.

In the film cassette described in the above-mentioned U.S. Pat. No. 4,423,943, an opaque sheet is attached to the film leader in order to exclude light and this is wound on the film roll within the cassette in more than one turn. However, such means merely complicates the manufacturing process of the film strip. In addition, waste is increased when the film is developed.

Moreover, in order to prevent the opaque sheet from floating from the outermost periphery of the film roll, the spool is provided with collars projecting from the outer periphery of flanges integrally formed with both end portions of the spool in such a manner as to be opposite to each other, and the collars press against the opaque sheet. In this case, it is required that the cassette and the spool be finished highly accurately. This is also unfavorable in respect of the number of working process steps and the manufacturing cost.

OBJECTS OF THE INVENTION

A main object of the present invention is to provide a film cassette in which the film leader can be smoothly and surely fed from the cassette by rotating a spool having a roll of film wound on it.

Another object of the present invention is to provide a film cassette in which the film withdrawing slot of the cassette is provided with light-excluding means such that a large load is not imposed on the film leader when the film is being fed by rotation of the spool.

A further object of the present invention is to provide a film cassette in which the frictional resistance between the outermost peripheral surface of the roll of film and the inner wall of the cassette is reduced when the roll of film is rotated within the cassette together with the spool.

SUMMARY OF THE INVENTION

In order to achieve the above objects, the film withdrawing slot formed in the cassette body is closed with light-excluding means which is designed such that the film leader can be smoothly withdrawn from the mouth. As such light-excluding means, there may be employed an openable and closeable cover member, a flexible baffle, or an arcuate film passage.

In case a cover member is employed, the cover member is moved to an open position by a mechanism on the side of the camera after the film cassette is placed in the film feeding chamber and the back cover member of the camera is closed. The spool rotatably contained in the cassette body has a roll of film wound thereon, and the end of the film is fixed to the spool. When the spool is rotated by the mechanism on the side of the camera, the roll of film is rotated within the cassette body together with the spool. As a consequence, the film leader of the roll of film is fed out from the cassette body through the film withdrawing slot which appears after the cover member is retracted. Since the masking of the film withdrawing slot can be achieved by closing the cover member, it is not necessary to provide a masking plush in the film withdrawing slot and so the film leader can be smoothly fed from the film withdrawing slot.

Furthermore, in case an arcuate film passage is provided, the film leader is fed from the film withdrawing slot through this film passage when the spool is rotated.

The curved passage portion serves not only as a guide for feeding the film leader but also as means for preventing light from entering the film withdrawing slot so as to prevent ambient light from directly reaching the roll of film in the cassette body. Preferably, a reflection-reducing treatment is performed on the inner surface of the film passage.

Also, in order to effectively mask the film with-drawing slot without imposing a heavy load on the film leader, it is desirable that a flexible masking member be attached to or disposed in the vicinity of the film withdrawing slot. As the masking member is readily deformed by the film leader when the film leader is fed, excessive resistance is not met by the film leader and a smooth movement of the film leader is assured.

As the film leader is fed from the cassette by rotation of the spool, if the torque is great then a heavy load is imposed on the mechanism for rotating the spool on the side of the camera. Accordingly, it is desirable that the frictional resistance between the inner wall of the cassette body and the roll of film be as small as possible. To this end, it is desirable that the cassette body and the spool be formed of a molded resin which contains an opacifying substance and that a lubricant be applied to the cassette body. As such a lubricant, a silicone oil comprising a dimethylpolysiloxane can be added to the resin in the amount of from 0.05 to 5.0 wt.%. In this case, the film can be smoothly fed without undue resistance from the cassette body and without loss of photographic performance.

As a smooth and sure feeding of the film leader is assured by rotating the spool as mentioned above, a camera using this film cassette no longer requires a mechanism for catching and withdrawing the film leader from the cassette, such as a conventional sprocket mechanism or the like, and therefore the structure of the camera can be simplified. Furthermore, even if the film including the leader is completely taken up within the cassette after all the photographs have been taken, the favorable masking feature can be maintained and the film strip can be fed out again simply by rotating the spool at the time the film is developed. Accordingly, the time and labor required for disassembling the cassette in order to take out the exposed roll of film which had been wound on the spool are saved and preliminary processing becomes easy at the time the film is developed.

BRIEF DESCRIPTION OF THE DRAWINGS

The above objects of and advantages obtained by the present invention will become apparent from the accompanying drawings and the detailed description of the invention to follow.

DETAILED DESCRIPTION OF THE INVENTION

Figure 1:
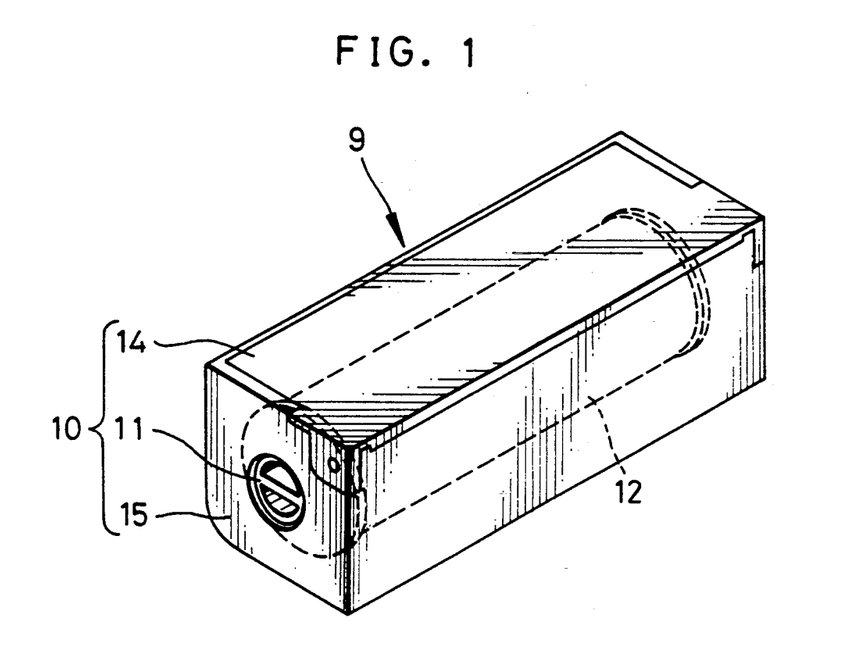
FIG. 1 is a perspective view of a film cassette according to one embodiment of the present invention.
Figure 2:
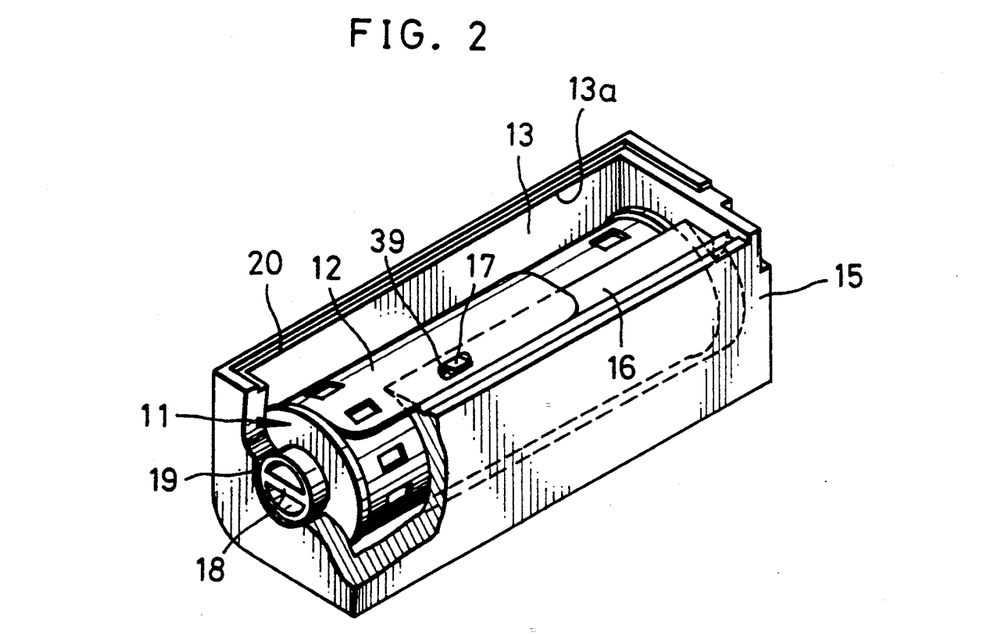
FIG. 2 is a perspective view, partly cutaway, showing the film cassette of FIG. 1 but wherein a cover member is removed therefrom.

In FIGS. 1 and 2 showing the first embodiment of a film cassette of the present invention, a film cassette 9 comprises a cassette 10 and a roll of film 12 contained in the cassette 10. The cassette 10 comprises a generally rectangular parallelepipedal cassette body 15, a cover member 14, and a spool A cylindrical pocket-like storing portion 13 for storing the spool 11 having a roll of film 12 wound thereon is formed in the cassette body 15, and the cover member 14 is mounted on the cassette body 15 in such a way that the cover member 14 can be opened and closed. The cover member 14 is attached at one side thereof to cassette body 15 by supersonic welding. In the illustrated example of FIG. 2, the cassette body 15 is shown with the cover member 14 removed from the cassette body 15.

Figure 18:
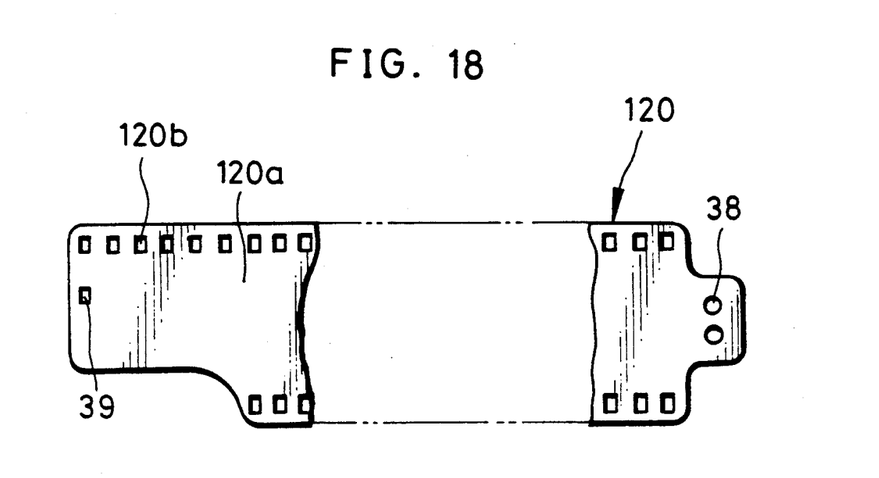
FIG. 18 is a partly broken-away view of a film strip to be wound on the spool.

As is shown in FIGS. 6 through 9, the cassette body 15 is provided on its upper surface with a rectangular opening 13a, and an eaves-like projecting portion 16 is integrally formed with the upper surface of the cassette body 15 in such a manner as to protrude from one side thereof. The eaves-like projecting portion 16 is provided on its upper surface with a retaining projection 17 which, as shown in FIG. 18, is engaged in a retaining hole 39 formed in a film leader 120a in order to prevent the film leader 120a from entering into the cylindrical pocket-like storing portion 13. The eaves-like projecting portion 16 is also provided with a groove 21 formed on the upper side of its base. Furthermore, a step 20 is formed on the other three sides surrounding the opening 13a.

The cassette body 15 has an opening 19 formed in one end 22 thereof and adapted to rotatably receive a driving boss 18 of the spool 11. Furthermore, the cassette body 15 is provided on both ends 22 and 23 thereof with thin cut-out portions 24 and 25 such that the cut-out portions 24 and 25 are located at both ends of the eaves-like projecting portion 16, and projecting members 26 and 27 project from the bottoms of the cut-out portions 24 and 25.

The under surface of the cover member 14, as shown in FIGS. 10 through 14, is provided with a recess portion 28 and a rib 29 which are formed in position corresponding to the retaining projection 17 and the groove 21, respectively. Similarly, the cover member 14 includes lugs 30 and 31 projecting from its ends in such a manner as to correspond to the cut-outs 24 and 25 which are formed in both ends 22 and 23 of the cassette body 15. Furthermore, holes 32 and 33 are formed in the lugs 30 and 31 at positions corresponding to the projecting members 26 and 27.

Figure 3:
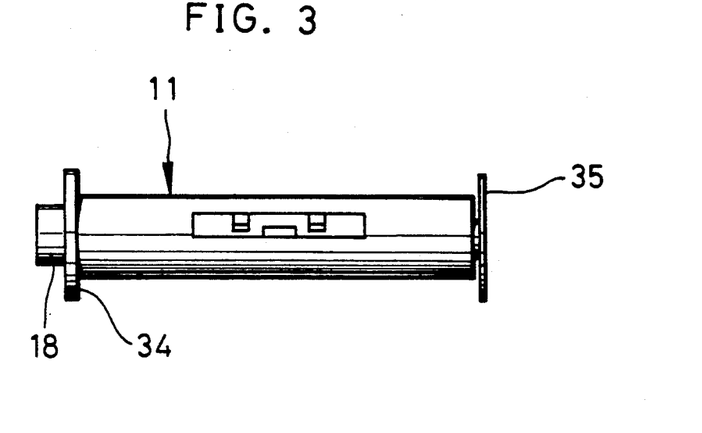
FIG. 3 is a side view of a spool shown in FIG. 2.
Figure 4:
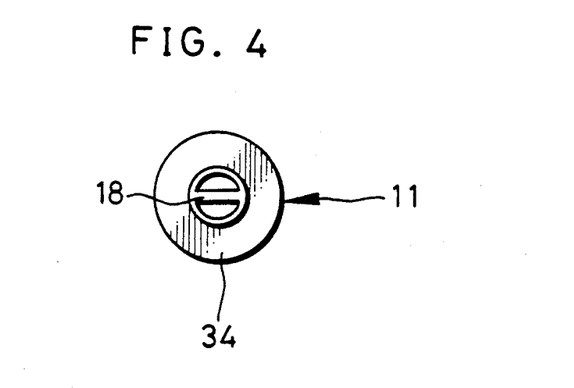
FIGS. 4 and 5 are left and right end views, respectively, of the spool of FIG. 3.
Figure 5:
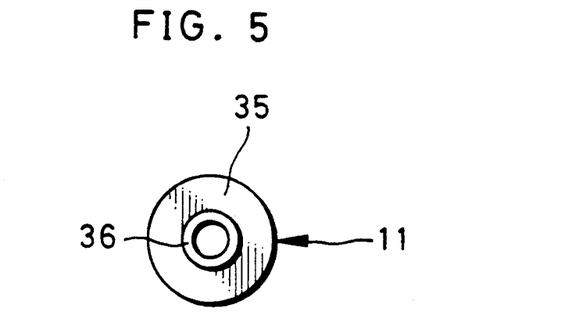
Figure 6:
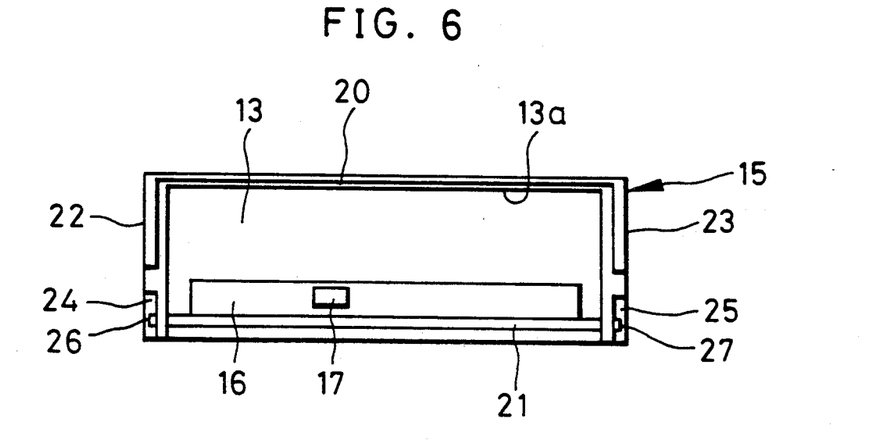
FIGS. 6 and 7 are a plan view and a front view, respectively, of the cassette body shown in FIG. 1.
Figure 7:
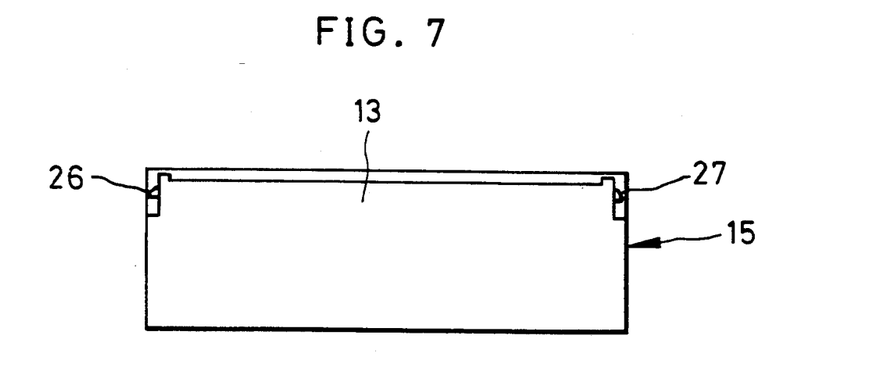
Figure 8:
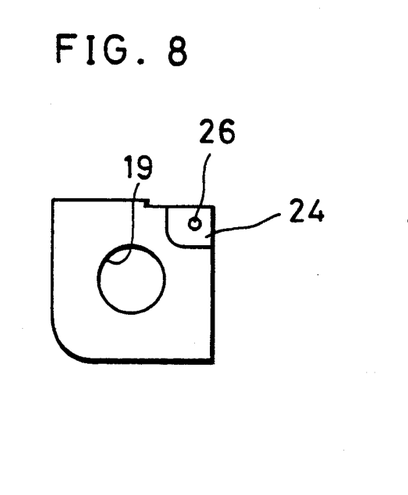
FIGS. 8 and 9 are respectively a left end view and a left end sectional view of the cassette body of FIG. 1.
Figure 9:
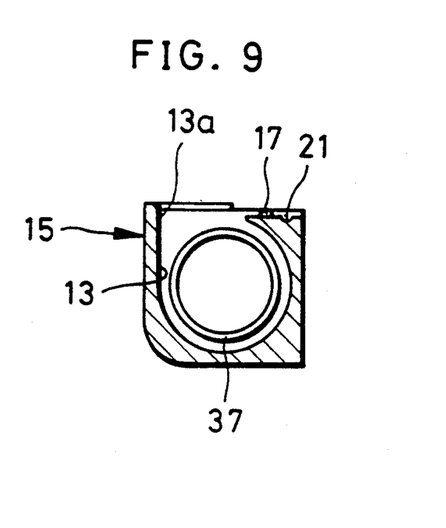
Figure 10:
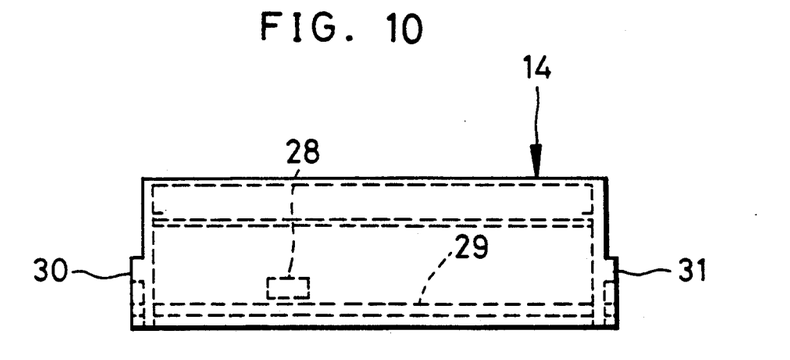
FIGS. 10 and 11 are respectively a top plan view and a front view of the cover member of FIG. 1.
Figure 11:
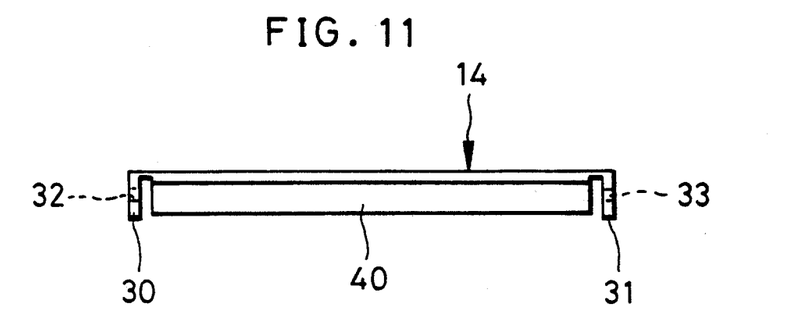
Figure 12:
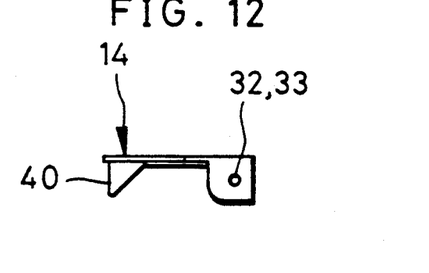
FIGS. 12 and 13 are respectively a left end view and a left end sectional view of the cover member of FIG. 1.
Figure 13:
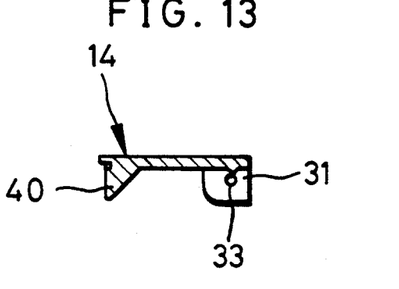
Figure 14:
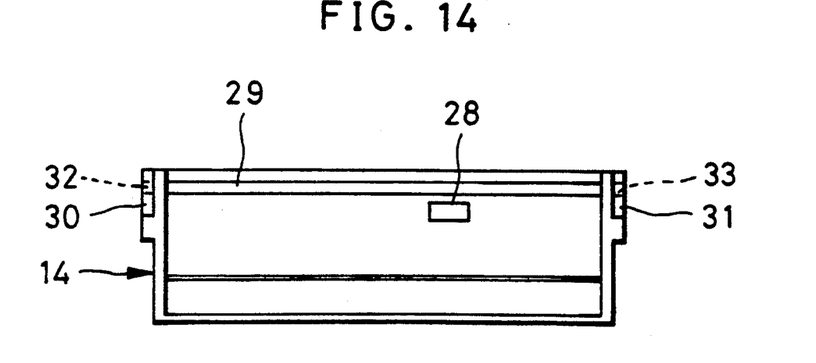
FIG. 14 is a bottom plan view of the cover member of FIG. 1.

The spool 11, as shown in FIGS. 3 through 5, has a driving boss 18 which is to be inserted into the opening 19 of the cassette body 15 at its one end. At opposite ends of the spool 11, flanges 34 and 35 are integrally formed in such a manner as to be slightly wider spaced apart than the width of the roll of film 12. An annular groove 36 is formed on the outer face of the flange 35. The groove 36 has a smaller diameter than that of an annular projection 37 which is formed on the inner surface of one end wall of the cassette body 15.

As is shown in FIG. 18, the film strip 120 is 35 mm in width and is provided with known perforations 120b along both side edges thereof. Furthermore, the end portion of the film strip 120 is provided with retaining holes 38 which are to be retained by the spool 11, and the film leader 120a is provided with a retaining hole 39 which is to be caught by the retaining projection 17. This film strip 120 is wound on the spool 14 to form the roll of film 12.

To assemble the film cassette 9, the spool having the roll of film 12 wound thereon is first put into the cassette body 15. At this time, as the flange 34 is located on the inner side of opening 19, light entering between the opening 19 and the driving boss 18 is stopped by the flange 34. Furthermore, the retaining hole 39 of the film leader 120a is engaged with the retaining projection 17 on the eaves-like projecting member 16 of the cassette body 15.

Figure 19:
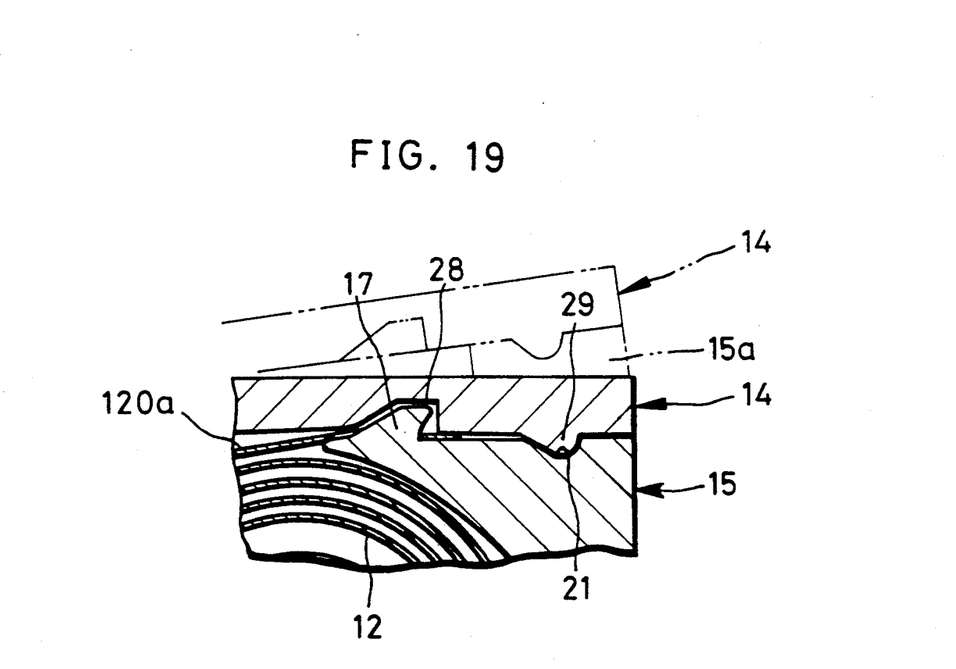
FIG. 19 is an enlarged fragmentary sectional view of the film cassette of FIG. 1.

After the spool 11 having the roll of film 12 wound thereon is put into the cylindrical pocket-like storing portion 13 of the cassette body 15, the cover member 14 is put on the cassette body 15 so that it covers the opening 13a. The piece 40 is integral with the rear side of the cover member 14, and the piece 40 is held in alignment with the inner side of the step 20. A supersonic horn is urged against the cassette body 15 from outside and the piece 40 is attached to the inner wall of the cassette body 15 at a lower portion of the step 20 by means of supersonic welding. Furthermore, the lugs 32 and 33 of the cover member 14 are inserted into the cut-outs 24 and 25 of the cassette body 15, and the projecting members 26 and 27 are engaged in the holes 32 and 33, respectively. In this position, the cover member 14 is intimately attached to the eaves-like projecting portion 16, the retaining projection 17 is engaged in the recess 28 and the rib 29 is engaged in the groove 21 as shown in FIG. 19. As a consequence, light is prevented from entering the cassette body 15.

Figure 17:
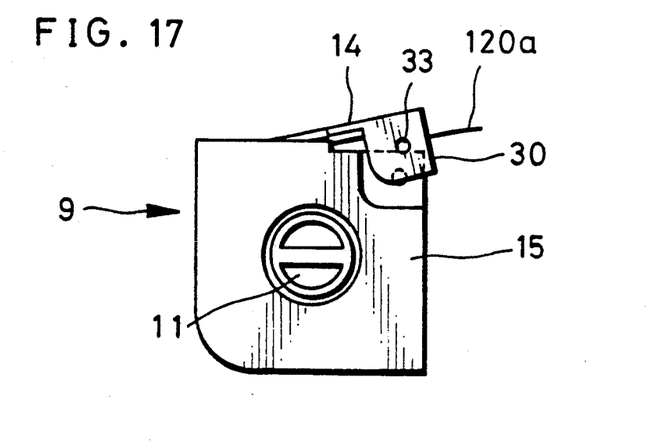
FIG. 17 is a left end view of the film cassette wherein the cover member is opened and the film leader is protuberant.

When a thus-constructed film cassette 9 is inserted in the camera and the known back cover member of the camera is closed, a cover member releasing mechanism (not shown) disposed on the side of the camera acts and release pins (not shown) enter into the holes 32 and 33 of the cover member 14 from the camera side. Then, when the release pin is moved, directed upwardly at an angle, the holes 32 and 33 and the projecting members 26 and 27 are integrated. Then, the free end side of the cover member 14, as shown in FIGS. 17 and 19, is elastically deformed and upon deforming, is moved to the open position. In this way, the film withdrawing slot 15a is formed.

Figure 15:
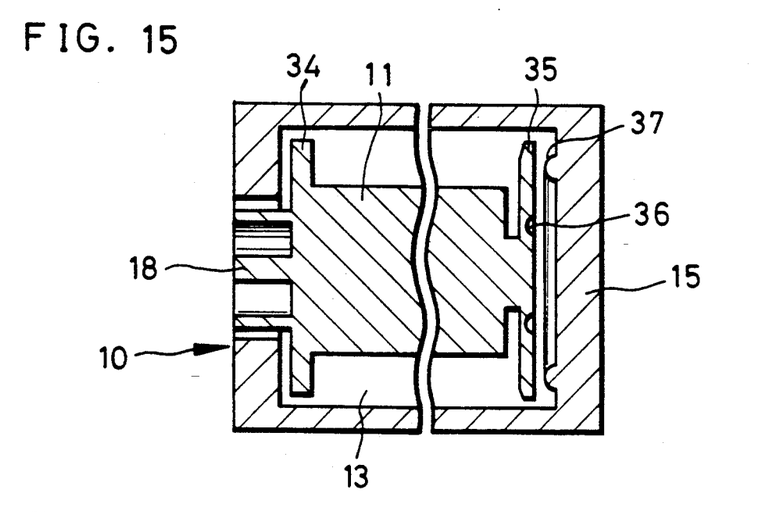
FIG. 15 is a vertical sectional view, partly cutaway, of the cassette body.
Figure 16:
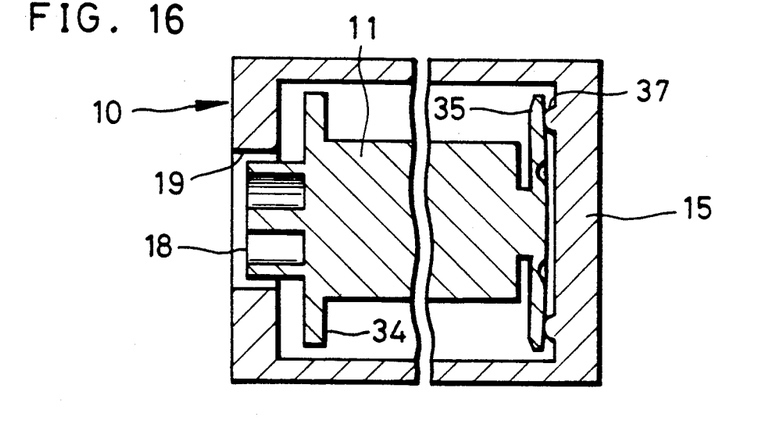
FIG. 16 is a vertical sectional view, partly broken away, of the cassette body having a modified spool flange.

Thereafter, when the film feeding mechanism on the side of the camera is actuated, in the first instance, the driving boss 18 of the spool 11 is pressed by a cam or the like on the side of the camera. As a consequence, the spool 11 is moved from the position shown in FIG. 15 to the position shown in FIG. 16. When the spool 11 is thus moved and the outer peripheral side of the flange 35 is urged against the annular projecting member 37 which is formed on the inner surface of the cassette body 15, the flange 35 is deformed at the annular thin portion 36 and inclined inward. As a result, both side edges of the roll of film 12 wound on the spool 11 are held between the flanges 34 and 35. Thereafter, when the driving boss 18 is driven in the film feeding direction through a feeding mechanism of the camera, the retaining relation between the retaining hole 39 of the film leader 120a and the retaining projection 17 of the cassette 15 is ended and the film leader 120a is fed outside the cassette, passing through the film withdrawing slot 15a. Thereafter, the film strip 120 is withdrawn from the roll of film 12 by the known sprocket or take-up spool mounted on the camera. If it is arranged that after the film leader 120a is wound on the take-up spool within the camera, the urging of the driving boss 18 is cancelled, the work of withdrawing the film strip 120 can be reduced.

After recording a predetermined number of images on the film strip 120, the exposed film strip 120 wound on the take-up spool is rewound into the cassette body 15. At the time this rewinding of the film is almost complete, the retaining hole 39 of the film leader 120a is caught again by the retaining projection 17. After the completion of the rewinding of the film, the back cover of the camera is opened to take out the film cassette 9. By this initial operation of the back cover, the release pins on the camera side are lowered and the cover member 14 is moved to the closed position. Immediately thereafter, the release pins escape from the holes 32 and 33. As a consequence, since the free edge of the cover member 14 is released, the film withdrawing slot 15a is closed and the interior of the cassette body 15 is maintained in a light-tight state again. By opening and closing the film withdrawing slot 15a in the manner described, the feeding resistance can be reduced at the film withdrawing slot 15a and a smooth feeding of the film can be performed. Furthermore, there can be realized a film cassette in which the film leader 120a does not protrude from the cassette body 15. Therefore, even an unfamiliar user can load the film cassette with ease in the same manner as handling a battery and cassette. Also, at the time the film is to be developed, if the cover member 14 is opened and the spool 11 is rotated, the film leader 12a can be fed. Therefore, the disassembly operations of the prior art are avoided.

The film cassette 9, the cassette body 15, the cover member 14 and the spool 11 can be formed of a polystyrene molded product, the outside dimensions of the cassette, for example, being 14 mm×14 mm×42 mm (the volume thus being about 8.1 cm$^3$), and a twelve-exposure photographic film of Leica size can be used as the roll of film 12. The weight will thus be about 8.6 g. A twelve-exposure Fuji collar HR (trade name), which is commercially available, has a volume of about 21.6 cm$^3$ and a weight of about 16.2 g. Thus, compared to the commercially-available product, the product of the present invention clearly is smaller in size and lighter in weight and hence less expensive.

In the above-described embodiment, the flange 35 is inclined inward by pressing the spool 11 from the driving boss 18 side, and the roll of film 12 is held between the flanges 35 and 34 in order to transmit the rotation of the spool to the roll of film 12. However, the present invention is not limited to this. In order to transmit the rotation of the spool 11 at the time the film is fed the structure shown in FIGS. 20 through 27 may be employed. The cassette body and the cover member shown in these figures are substantially the same as the cassette body and the cover member shown in FIGS. 1 through 19, and therefore like reference numerals are used.

Figure 20:
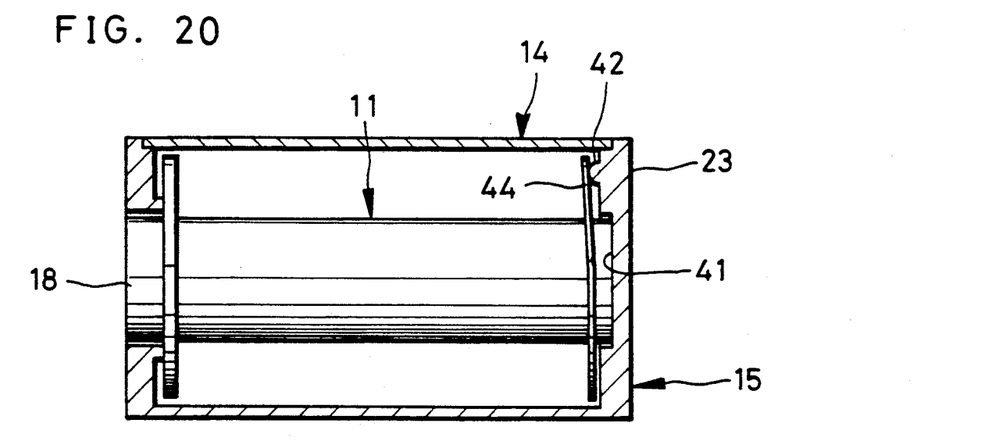
FIGS. 20 through 22 are vertical sectional views showing the principal parts of the cassette according to different embodiments.

In the embodiment of FIG. 20, a projection 42 is formed on the inner wall of one end 23 of the cassette body 15 adjacent a recessed portion 41. When the spool 11 is disposed in the cassette body 15, the projection 42 causes a part of the flange 44 to be inclined inward. In this embodiment, therefore, before the film leader 120a is fed, it is not necessary that the spool 11 be pressed from the driving boss 18 side. Instead, the film leader 120a can be fed merely by rotating the spool 11.

Figure 21:
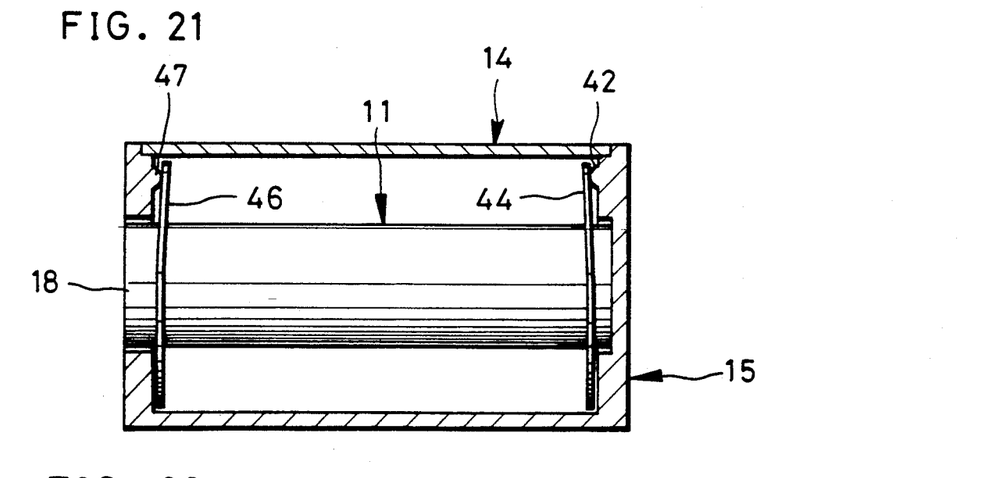
Figure 22:
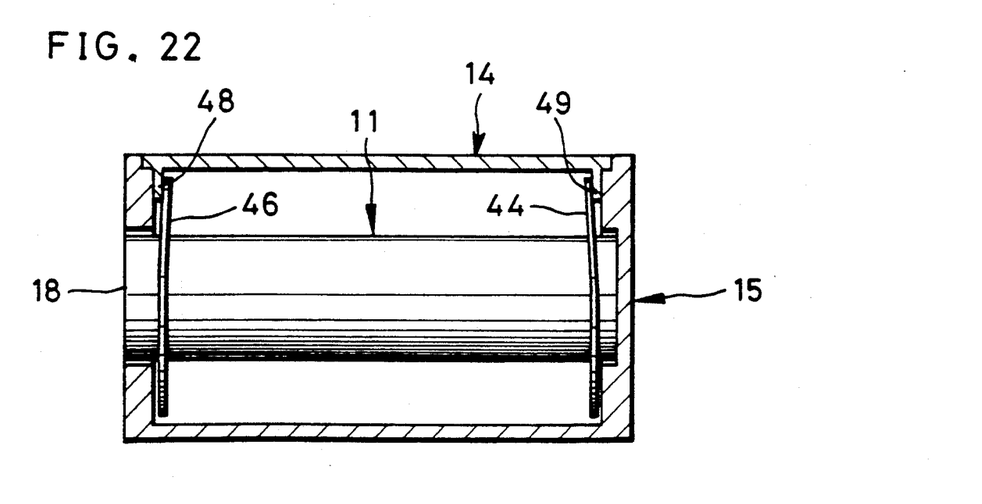

In the embodiment of FIG. 21, there is shown a construction in which the other flange 46 is also deformed by a projection 47. In the embodiment of FIG. 22, projections 48 and 49 for deforming the flanges 44 and 47 are formed integrally with the inner surface of the cover member 14.

When the cassette body 15, the cover member 14 and the spool 11 are formed of polystyrene, the molding materials are combined with a predetermined quantity of a dimethylpolysiloxane silicone oil or a carboxyl denatured silicone oil as well as an opacifying substance. This carboxyl denatured silicone oil is obtained by denaturing the methyl group of dimethylpolysiloxane to the carboxyl group. By adding this silicone oil, even in a film cassette having a film size of 35 mm or more, the friction between the inner wall of the cassette body and the film can be reduced. Thus, a smooth feeding of a film is obtained. The silicone oil may be added to either the cassette body 15 or the spool 11.

If the addition of the dimethylpolysiloxane silicone oil or the carboxy denatured silicone oil is less than 0.05 wt.%, the slip effect is unobtainable. On the other hand, if it exceeds 5.0 wt.%, as the resin slips within a screw portion of a molding machine, the molding cycle becomes too long and the quantity of the silicone oil oozing out on the outer surface of the cassette body is increased. As a result, the strength of the supersonic seal between the cassette body 15 and the cover member 14 becomes too low. Moreover, the silicone oil that oozes out on the outer surface of the inner wall of the cassette and the outer surface of the spool 11 clings to the film. As a result, the diffusion of the development liquid to the film is prevented when the film is developed. In view of the foregoing, the addition of the dimethylpolysiloxane silicone oil or the carboxyl denatured oil is limited to from 0.05 wt.% to 5.0 wt.%, and preferably to from 1 wt.% to 3 wt.%.

Also, the viscosity of the silicone oil is preferably from 1,000 to 60,000 cp. at 25° C. If the viscosity is less than 1,000 cp. at 25° C., the feed-out is difficult and the photographic performance is thus adversely affected. On the contrary, if it exceeds 60,000 cp., the kneading with the resin is impeded and the resulting mixture is hardly usable. As the silicone oil, many kinds of denatured silicone oils such as fluorized denatured silicone oil are also commercially available. Most of them, however, could not be used adjacent the film because they adversely affect the film, or they fail to provide a sufficient slipping property, or are subject to heat decomposition, or the like.

Although the resin used in the present invention includes polystyrene, shock-resistant polystyrene, styrene-acrylonitrile copolymer resins, ABS resins, polypropylene resins, high-density polyethylene resins, etc., the present invention is not particularly limited to them.

Also, there are many kinds of carbon blacks which can be added in order to obtain opacity and anti-static properties. However, to avoid adverse photographic action (generation of photographic fog, degrading of sensitivity, upgrading of sensitivity, etc.) and for suitable opacity, a furnace carbon black having an average particle diameter of from 10 to 80 mμ and a pH from 5 to 9 is preferable, a furnace carbon black of from 15 to 50 mμ and a pH from 6 to 8 being particularly preferable.

If the particle diameter of the carbon black is less than 10 μm, the kneading with the resin is impeded. Therefore, the opacity and physical strength are diminished. On the contrary, if it exceeds 100 mμ, the dispersion becomes good but the opacity is poor. When the carbon concentration was increased in order to improve opacity, the physical strength was decreased and the moldability was diminished, and therefore, the result was hardly usable in actual practice. Most of the carbon blacks having a pH outside the above-mentioned range were photographically adversely active and thus unusable.

The addition of this furnace carbon black is limited to from 0.05 wt.% to 3.00 wt.% so as to obtain at the same time opacity, injection moldability, and adequate physical strength of the cassette. If the addition of the carbon black is less than 0.05 wt.%, the opacity is insufficient and if it exceeds 3.00 wt.%, the physical strength of the cassette is lowered and the coefficient of water absorption is increased. Moreover a weld mark and a silver streak are generated upon injection molding. As a result, excess carbon gives rise to problems such as the appearance being spoiled and the surface strength being decreased.

As opacifying substances, inorganic pigments such as titanium oxide, iron oxide red, calcium carbonate or organic dye may be used in addition to carbon black.

Next, there will be described examples for manufacturing the cassette 10 shown in FIGS. 1 through 19. By using a resin obtained by adding 0.5 wt.% of carbon black and 2.0 wt.% of dimethylpolysiloxane silicone oil (available from Shinetsu Chemical Co. Ltd., Japan, under the trade name KF-96H, 30,000 cp) to the shock-resistant polystyrene, the cassette body 15, the cover member 14 and the spool 11 were molded by injection molding.

In the same manner as for the product of the present invention, a cassette as a comparison product A was made using a resin obtained by adding 0.5 wt.% of carbon black to the shock-resistant polystyrene. This comparison product A does not contain the dimethylpolysiloxane silicone oil. Also, by using a resin obtained by adding 0.5 wt.% of carbon black and 1.0 wt.% of oleic acid amide, which is generally used as a lubricant, instead of the dimethylpolysiloxane silicone oil, to the shock-resistant polystyrene, a comparison product B was made in the same manner as for the product of the present invention. The characteristics of these three cassettes were measured. The results are shown in Table 1.

TABLE 1

|  | Product of the Invention | Comparison Product A | Comparison Product B |
|---|---|---|---|
| Coefficient of static friction | 0.12 | 0.45 | 0.35 |
| Failure of attachment between spool and cassette body (%) | 0.00 | 8.7 | 8.6 |

Although the above-mentioned embodiment of molding materials shows a representative preferred embodiment of the cassette of the present invention, the present invention is not limited to this. The evaluation in the above Table should be interpreted as follows:

Coefficient of static friction: Coefficients of static friction of test samples having a width of 35 mm and a length of 75 mm formed by injection molding.

Failure of attachment: The percentage of unsuccessful attachment between spools and cassette bodies when 1,000 pieces of spool and 1,000 pieces of cassette bodies are combined and the parts of the cassette body are welded by supersonic welding.

Although the above-described embodiment employs a cover member 14 which is closed when the cassette body 15 is not loaded in the camera and opened when the cassette body 15 is loaded in the camera in order to keep the interior of the cassette body 15 light-tight, the present invention is not limited to the use of a cover member 14. Also, the type of the cover member 14, when used, is not limited to the illustrated embodiment in which the film withdrawing slot is opened by slightly rotating the cover member 14 in the rising direction. There may be employed various types of which the cover member 14 is opened widely until it forms almost a right angle, the film withdrawing slot in this instance being formed by pushing the cover member 14 into the cassette body 15, and in which the cover member 14 is opened by being slid along the cassette body 15. Among these various types of cover members, a suitable cover member can be selected in accordance with the mechanism on the side of the camera.

Figures 23, 24, 25:
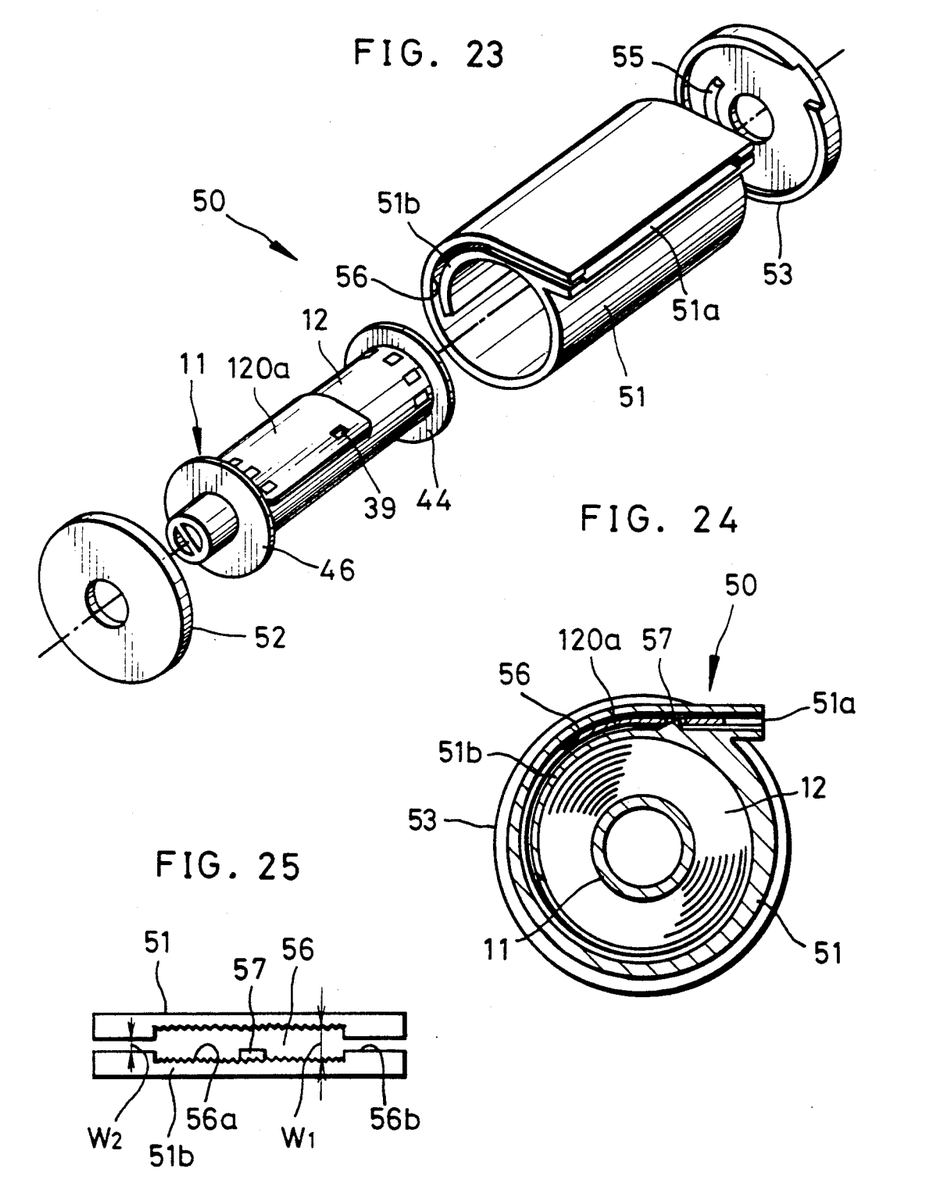
FIG. 23 is an exploded perspective view of a film cassette according to another embodiment of the present invention.
FIG. 24 is a sectional view of the embodiment shown in FIG. 23.
FIG. 25 is a front view showing the film passage according to the embodiment of FIG. 23.

FIG. 23 shows an embodiment of a cylindrical film cassette of the present invention, wherein like component parts of the preceding embodiment are represented by like reference numerals. This film cassette 50 has a configuration similar to that of conventional film cassettes and has no cover member at the film withdrawing slot. A generally cylindrical cassette body 51 rotatably contains a spool 46 having a roll of film 12 wound thereon, and end caps 52 and 53 are fitted onto opposite ends of the cassette body 51. One of the end caps 52 and 53 may be integral with the cassette body 51.

A projection 55 performing a function similar to that of the projection 42 shown in FIG. 20 is formed on the inner surface of the side plate 53. When the spool 11 is contained in the cassette body 51 and the end plate 52 and 53 are added, the flange 44 of the spool 11 is inclined inward to hold the roll of film 1 between the flanges 44 and 46. The projection 55 contacts a part of the flange 44. In comparison to a construction having a projection contacting the entire periphery of the flange 44, the FIG. 23 construction is highly advantageous for reducing friction when the spool 11 is rotated.

The cassette body 51 and the end caps 52 and 53 are formed of molded resin as described above. The cassette body 51 has an arcuate guide piece 51b integrally formed with the interior thereof. By this guide piece 51b, an arcuate guide passage 56 communicating with the film withdrawing slot 51a is formed. The film leader 120a, as shown in FIG. 24, is disposed in the guide passage 56.

FIG. 25 shows a section of the guide passage 56. The guide passage 56 comprises a wide passage 56a and a narrow passage 56b. When guiding, the narrow passage 56b contacts both side edges of the film strip 120. As the wide passage 56a does not contact either side edge of the film strip 120, there is no danger that it will scratch the film strip 120 when the film strip 120 is moved. The outer surface of the wide passage 56a is a mat surface on which a number of micro bumps and valleys are formed. If the guide passage 56 is formed to have an arcuate shape and the outer surface of the wide passage 56a is given a mat surface, then even if light should enter from the film withdrawing slot 51a, the light would not be transmitted within the guide passage 56 and no photographic fog would be generated on the roll of film 12 within the cassette body 51.

The width W1 of the side passage 56a is preferably 0.8 mm or less in order to maintain the masking function and the width W2 of the narrow passage 56b is preferably 0.2 mm or more in order to reduce the frictional resistance when the film is fed. Furthermore, the length of the arcuate portion of the guide passage 56 is preferably at least 5 mm. Moreover, if the film leader 120a is dyed with a dye having an opacifying ability or if the outer surface of the film leader 120a is provided with knurling in order to reduce the reflectance of this portion, the masking function can be improved.

In this embodiment, the guide passage 56 is provided on one surface thereof with a retaining projection 57 and the engaging hole 39 of the film leader 120a is retained in the guide passage 56 by the retaining projection 57. If the spool 14 is rotated in the entraining direction of the film leader 120a, the winding diameter of the roll of film 12 becomes large. As a result, the spool 11 is difficult to rotate in this direction. In order to overcome this inconvenience, the engaging projection 57 may be omitted.

According to the foregoing, as the roll of film 12 is held between the flanges 44 and 46 of the spool 11, if the spool 11 is driven in the feeding direction of the film, the film leader 120a can be fed from the film withdrawing slot 51a via the guide passage 56. When rewinding is performed after all the photographs are taken, the engaging hole 39 of the film leader 120a is caught by the retaining projection 57. Therefore, when the film is to be developed, the film leader 120a can be easily fed out of the cassette body 51 from the exposed roll of film 12 by rotating the spool 11.

Figure 26:
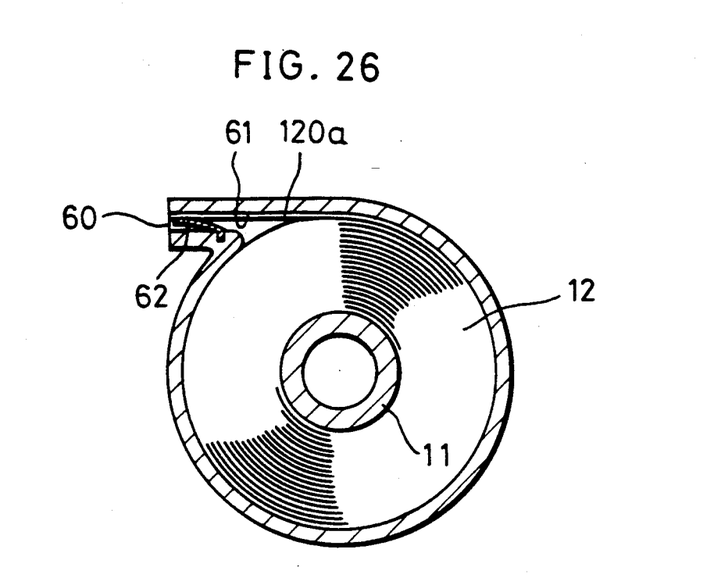
FIG. 26 is a cross sectional view of the film cassette according to still another embodiment of the present invention.

In order to prevent light from entering the cassette through the film withdrawing slot and to maintain the film leader in the vicinity of the film withdrawing mouth, the embodiment shown in FIG. 26 may be used. A resilient mask 62 is firmly attached to one inner surface of a film passage 61 communicating with a film withdrawing slot 60. As this mask 62, an opaque plastic sheet can be used. Due to its own resiliency, the shading piece 62 presses the film leader 120a against the other inner surface of the film passage 61 and holds it there. By virtue of the foregoing arrangement, light from the film withdrawing slot 60 is not allowed to enter the film passage 61.

Figure 27:
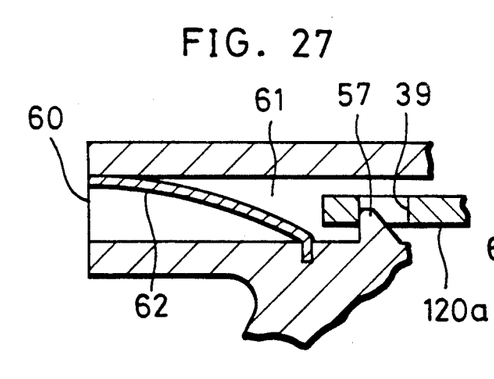
FIG. 27 is an enlarged fragmentary sectional view showing the vicinity of the film drawing slot according to a further embodiment of the present invention.

As is shown in FIG. 27, it may be desired that the film passage 61 be provided therein with a retaining projecting member 57 for retaining the retaining hole 39 of the film leader 120a so that the position of the film leader 120a is regulated by the retaining projecting member 57 and the engaging hole 39 and the film withdrawing slot 60 is masked by the mask 62.

Figure 28:
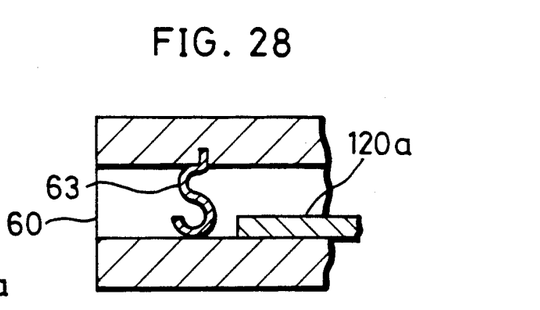
FIGS. 28 through 30 are enlarged fragmentary sectional views showing the vicinity of the film withdrawing slot in order to show other embodiments of light masks.
Figure 29:
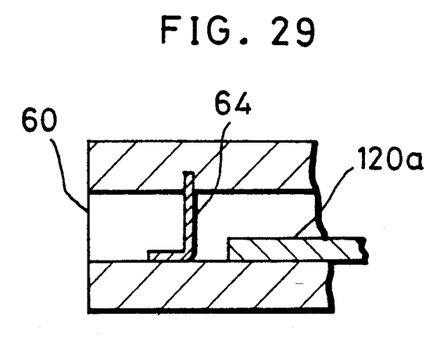
Figure 30:
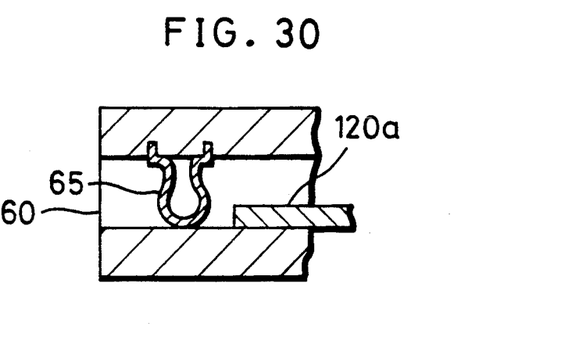

As other examples of the mask 62 which can be used for the above purposes, there can be mentioned a plastic sheet attached to a thin metallic plate, a plastic sheet on which metal has been deposited, laminations thereof, etc. These are not necessarily limited to a flat shape. Thus bent masks 63, 64 and 65 as shown in FIGS. 28 through 30 may be used. Moreover, a plurality of masks may be disposed on one side or both sides of the film passage.

Figure 31:
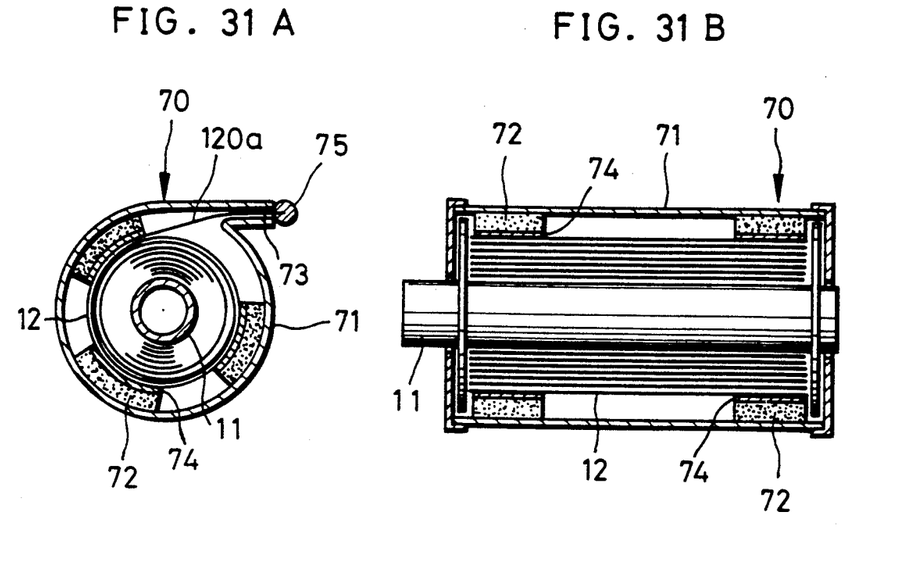
FIGS. 31A and 31B are respectively a cross sectional view and a vertical sectional view showing a film cassette according to a further embodiment of the present invention.

In the above-mentioned embodiments, the flange 18 is integrally formed with the spool and the film leader is fed by transmitting the rotation of the spool to the roll of film through the flange. However, the manner of feeding the film leader is not necessarily limited to this. The film cassette 70 shown in FIGS. 31A and 31B is constructed such that a resilient member 72 formed of a sponge is firmly attached to the inner wall of the cassette body 71 in order to press the roll of film 12 wound on the spool 11 against the spool 11. Owing to this construction, when the spool 11 is rotated in the feeding direction of the film, the roll of film 12 does not balloon from the spool 11, and so the rotation of the spool 11 can be transmitted to the film leader 120a at the outermost periphery, and the film leader 120a can be fed from the film withdrawing slot 73.

Furthermore, it is preferable that a lubricant layer be provided on the outer surface of the elastic member 72 in order to reduce the frictional resistance between the elastic member 72 and the film. Smooth film feeding will result if the following relation is always maintained;

$$\mu_2 \geq \mu_1$$

wherein $\mu_1$ is the coefficient of friction between the lubricant layer 74 and the film and $\mu_2$ is the coefficient of friction between the turns of the film.

A sponge formed of a polyurethane having a thickness of 3 mm and compressed 50% (under 50 g/cm$^2$ pressure) gave favorable results as the sponge used for the elastic member 72, and a lubricant obtained by attaching "mending tape 810" (trade name of Sumitomo 3M Ltd. in Japan) to the elastic member 72 gave good results as the lubricant 74. Also, in this embodiment, a rod-like retaining member 75 is firmly attached to the front end of the film leader 120a in order to hold the film leader 120a at the film withdrawing slot 73. Therefore, when the film strip is drawn into the cassette, the film leader 120a is prevented from being drawn into the cassette by the retaining member 75 and the film withdrawing slot 73 is at the same time masked.

Figure 32:
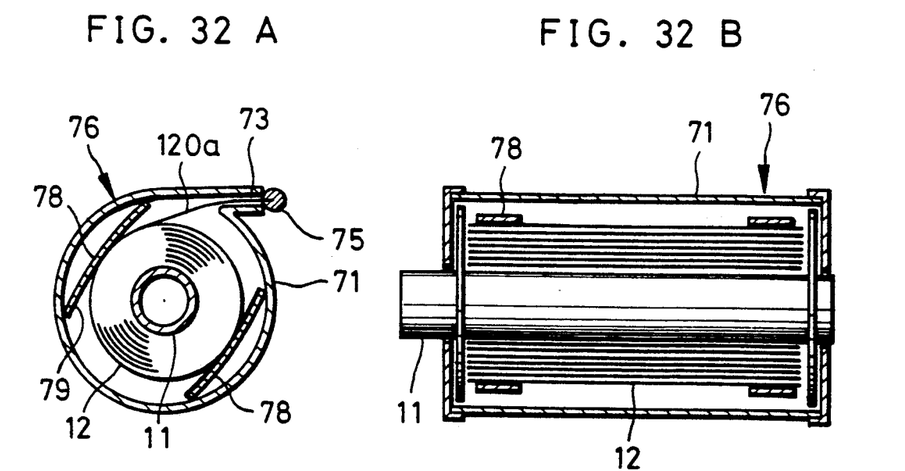
FIGS. 32A and 32B are respectively a cross sectional view and a vertical sectional view of a film cassette according to a still further embodiment of the present invention.

Likewise, in a film cassette 76 shown in FIGS. 32A and 32B, a plate spring 78 is used as an elastic member for pressing the film roll 12 against the spool 11. A silicone manganese steel having a thickness of 0.1 mm, for example, is suitable as the material of the plate spring 78. It is preferable that the aforementioned "mending tape 810" be used as the lubricant layer 79 formed on the inner surface of the plate spring 78.

Figure 33:
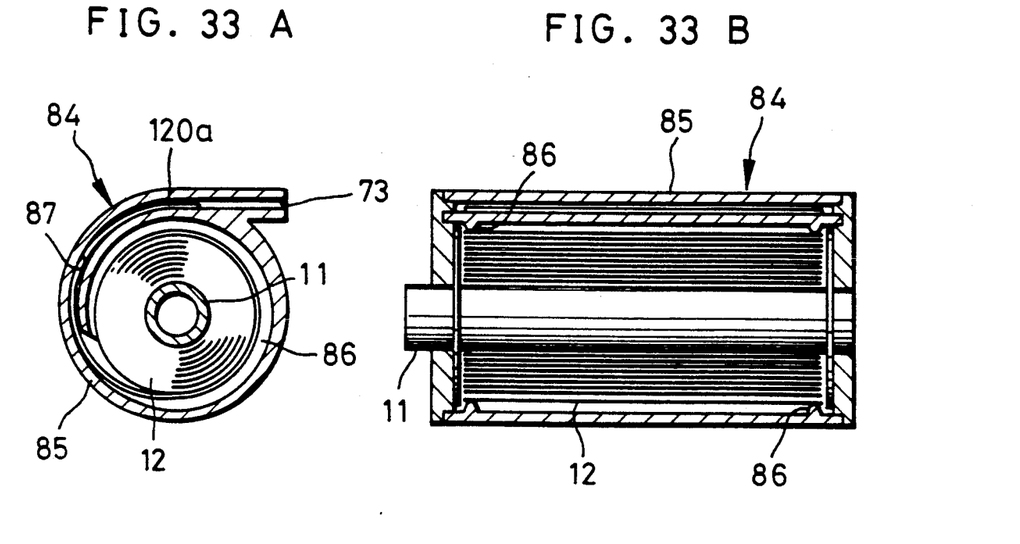
FIGS. 33A and 33B are respectively a cross sectional view and a vertical sectional view of a film cassette according to a still further embodiment of the present invention.

Furthermore, in the film cassette 84 shown in FIGS. 33A and 33B, an arcuate rib 86 is integrally formed with the inner wall of the cassette body 85, and the rib 86 is in contact with the outermost periphery of the film roll 12 wound on the spool 11 under pressure. The rib 86 does not impose high friction on the film in roll 12. A large frictional force is not imposed on the roll of film 12 by the rib 86. Also, thanks to the rib 86, the windings of the roll of film 12 can be prevented from ballooning by the rib 86, so that when the spool 11 is rotated, the rotation is immediately transmitted to the film leader 120a. The film leader 120a is fed out from the film withdrawing slot 73 via a film passage 87 having the same configuration as the embodiment shown in FIG. 3. The retaining projection 57 may be provided in the film passage 87 as in the embodiment shown in FIGS. 23 through 25.

As means for feeding the film out of the cassette body by the rotation of the spool, there may be used structure as disclosed in U.S. Pat. No. 4,832,275 in which the film roll is prevented from being loosened by two rings which are inclined with respect to the shaft of a spool. Another such construction is disclosed in U.S. Pat. No. 4,834,306 in which a pair of opposite ribs are formed on a flange integrally formed on both ends of a spool so as to prevent the loosening of the winding by restraining both side edges of the roll of film and to deform the ribs at positions for feeding the film. Still another is disclosed in U.S. Pat. No. 4,846,418 in which by sliding a spool in the axial direction, the roll of film is held between the flanges so that the rotation of the spool is transmitted to the roll of film. The present invention is likewise applicable to any of these.

The present invention can be modified and altered into various forms and these modifications and alterations should be interpreted as being included in the scope of the protection of the present invention.

What is claimed is:

1. A film cassette having a cylindrical cassette body, a spool rotatable within said cassette body, and a roll of film wound on said spool, said film cassette comprising:

a film withdrawing slot formed in said cassette between two opposite wide inner surfaces of a film passage that terminates in said slot;

a mask on at least one of said wide inner surfaces, said mask resiliently contacting the other said wide inner surface under pressure; and film feeding means for transmitting rotation of said spool to a roll of the film wound on said spool in order to feed a film leader on said film from said film withdrawing slot, said film feeding means comprising a pair of flanges integrally formed with both end portions of said spool, and a projecting member formed on an inner wall of said cassette body and adapted to deform one of said flanges toward the other flange in order to hold said roll of film between said pair of flanges when said film lead is fed.

2. A film cassette having a cylindrical cassette body, a spool rotatable within said cassette body, and a roll of film wound on said spool, said film cassette comprising:

a film withdrawing slot formed in said cassette between two opposite wide inner surfaces of a film passage that terminates in said slot;

a mask on at least one of said wide inner surfaces, said mask resiliently contacting the other said wide inner surface under pressure; and film feeding means for transmitting rotation of said spool to a roll of film wound on said spool in order to feed a film leader on said film from said film withdrawing slot;

said cassette body being of plastic and said mask being of sheet material having at least one edge attached to said plastic, said mask having an opposite edge also attached to the plastic of said cassette body, said mask forming a loop between said attached edges, the loop having a midportion that resiliently contacts said other wide inner surface.

3. A film cassette having a cylindrical cassette body, a spool rotatable within said cassette body, and a roll of film wound on said spool, said film cassette comprising:

a film withdrawing slot formed in said cassette between two opposite wide inner surfaces of a film passage that terminates in said slot;

a mask on one of said wide inner surfaces, said mask resiliently contacting the other said wide inner surface under pressure;

film feeding means for transmitting rotation of said spool to a roll of film wound on said spool in order to feed a film leader on said film from said film withdrawing slot; and a retaining projection formed on said one wide inner surface on the opposite side of said mask from said slot and engageable in a retaining hole formed in said film leader thereby releasably to hold said film leader adjacent said slot.

* * * * *